Nov. 18, 1930.　　　D. C. DOBBINS　　　1,782,343

TRANSMISSION MECHANISM

Filed April 21, 1930　　　3 Sheets-Sheet 1

Inventor
Donald C. Dobbins,
By Emery, Booth, Varney & Holcombe
Attorneys

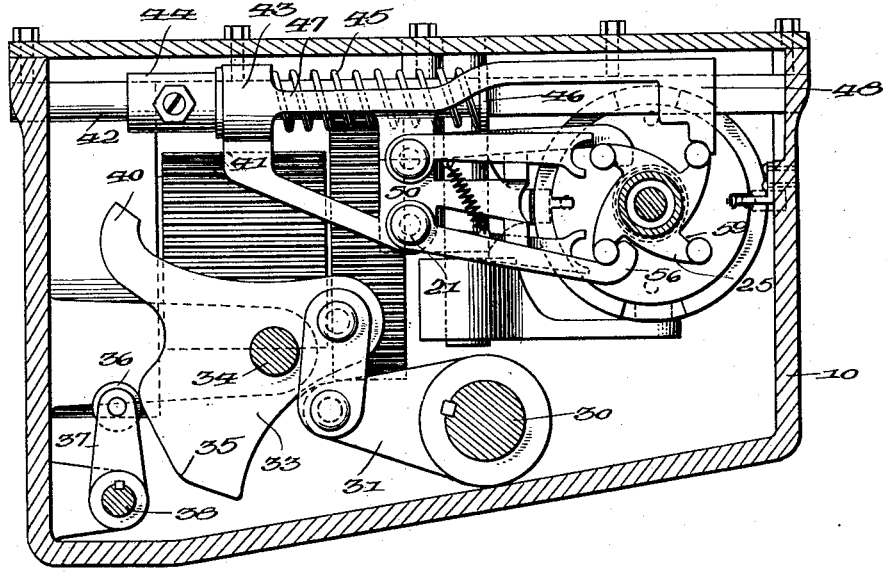

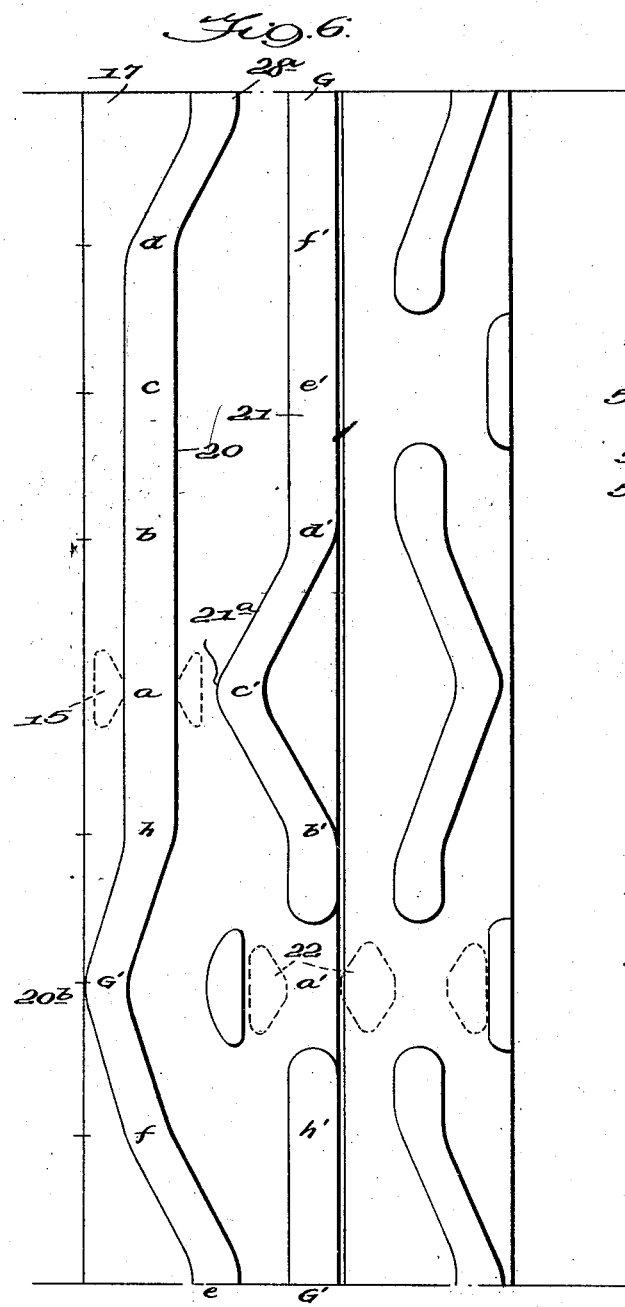

Patented Nov. 18, 1930

1,782,343

UNITED STATES PATENT OFFICE

DONALD C. DOBBINS, OF CHAMPAIGN, ILLINOIS

TRANSMISSION MECHANISM

Application filed April 21, 1930. Serial No. 446,007.

The present invention relates to change speed transmissions of the shiftable gear type for motor driven vehicles and the like and aims generally to improve the mechanism for shifting said gears.

More particularly the invention relates to the improvement of means controlled solely by the depression of the clutch pedal for successively shifting the change speed gearing progressively, optionally in speed increasing or decreasing direction, through a series of different speeds, as more generally embodied in my copending application Serial No. 433,981, filed March 7, 1930.

To this end the present invention provides improved and simplified mechanism for the shifting of the shiftable gears controlled from the clutch pedal.

Numerous specific objects and advantages of this invention will be readily apparent from the following description of a preferred embodiment of the invention which has been selected for illustrative purposes in the accompanying drawings, wherein Fig. 1 is a plan view of my improved transmission;

Fig. 2 is a vertical sectional view thereof taken on the line 2—2 of Fig. 1 looking in the direction of the arrows;

Fig. 3 is a vertical sectional view taken on the line 3—3 of Fig. 1 looking in the direction of the arrows;

Fig. 4 is a vertical transverse sectional view taken on the line 4—4 of Fig. 3;

Fig. 5 is a similar view taken on the line 5—5 of Fig. 3; and

Fig. 6 is a diagrammatic or plan view of the controlling cams for actuating the shiftable gear yokes.

Figure 1:
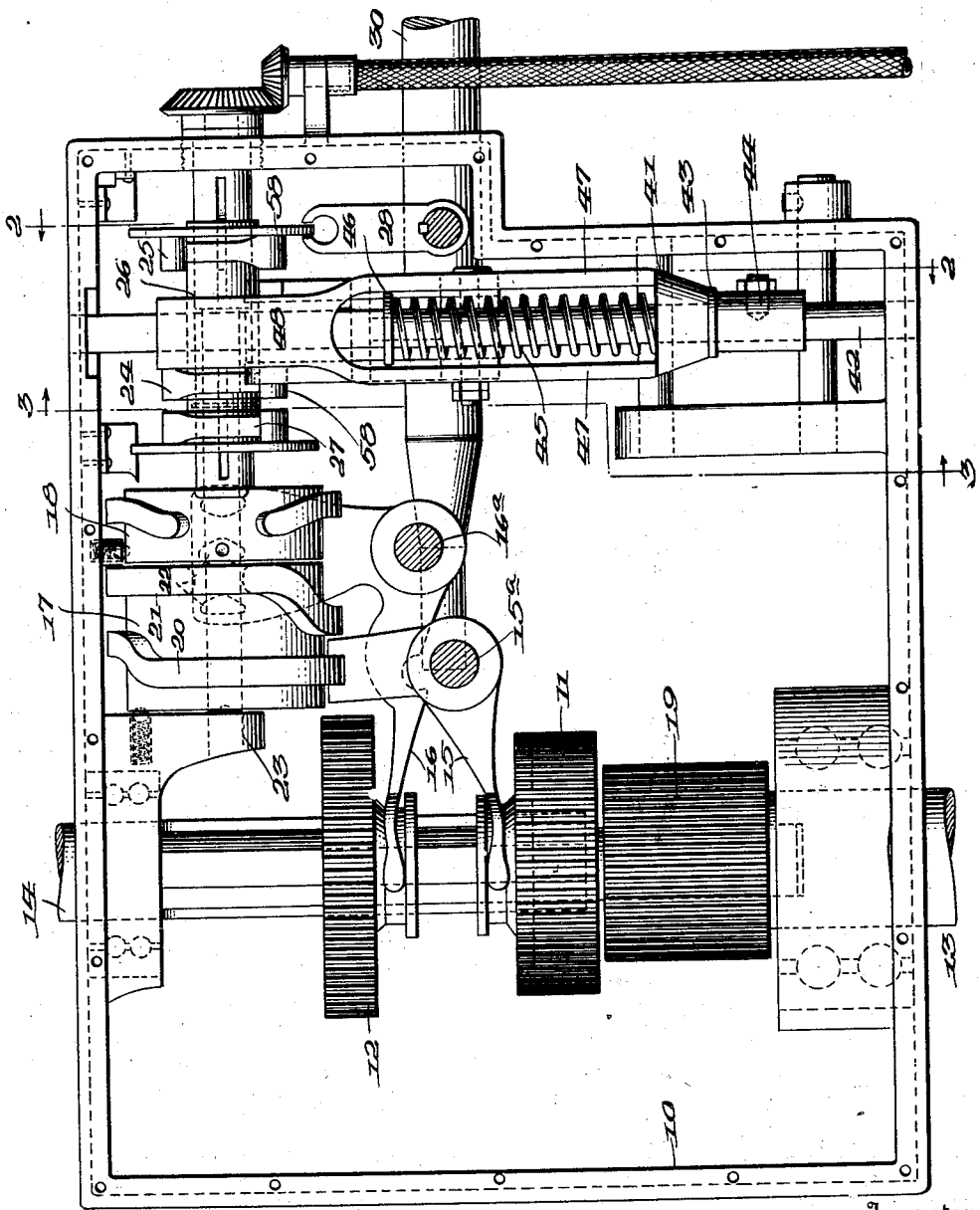

In the illustrated embodiment of the invention the transmission casing 10 houses the transmission gears and shifting mechanism, so that the entire mechanism may be assembled and readily installed as a unit in the vehicle as in my copending application above referred to.

The transmission gearing may be of any conventional or standard design, preferably of the shiftable gear type, wherein selective driving speeds through low, intermediate, high and reverse gear drives may be readily obtained by shifting one or more coupled pinions, herein designated at 11 and 12 into engagement with direct, intermediate, low and reverse gears respectively as described in my said copending application, and as readily understood. In this manner desired driving speeds may be obtained for operatively connecting in driving relation a clutch controlled driving shaft 13 with the driven shaft 14.

As is usual in such devices, and as disclosed in my copending application above referred to, the shifting of the pinions 11 and 12 may advantageously be effected by yokes 15 and 16, or the like, suitably of bell crank form, pivotally mounted in the casing 10 upon posts 15$^a$ and 16$^a$, and operatively connected to controlling cams 17 and 18, rotatably mounted in the casing. The cam 17 has a continuous peripheral rim 20 operatively controlled by gear shifting yoke 15 to shift the pinion 11 from its neutral or idle position (as shown in Fig. 1), forwardly for direct driving connection with gear 19, or rearwardly for driving connection with an intermediate or second speed gear, not shown. The cam 17 has a second discontinuous rim 21 running between bosses 22 on the yoke 16 for shifting the yoke and its pinion 12 into driving engagement with low speed or reverse gears, as is well understood.

Progressive partial rotations of the cam members 17 and 18 to shift the pinions 11 and 12 into desired position, are preferably effected and controlled partly by and during depression of the clutch pedal (not shown) to first shift the pinions into neutral position, and then automatically upon release of the clutch pedal, to shift the pinions 11 and 12 into engagement with the next higher or next lower speed gear, depending upon whether it is desired to increase or decrease the speed of the vehicle.

As in my copending application above referred to, the cam 17 is keyed upon a shaft 23 journalled in suitable bearings in the transmission casing, and is given partial rotation to effect shifting of the gear shifting yokes by means of rotary members such as ratchet wheels 24 and 25 reversely arranged upon a sleeve 26 splined to the shaft 23. The rotary member 24 is adapted to be rotated in a counter-clockwise direction to impart similar partial rotation to the cam 17 for shifting the transmission gears in speed increasing order, and the rotary member 25 is adapted to be rotated in a clockwise direction to impart similar partial rotation to the controlling cams for shifting the gears in speed decreasing order. A third rotary member 27 connected to the reversing cam 18 and sleeved upon the shaft is adapted to rotate the cam in a counter-clockwise direction to shift the pinion 12 into and out of engagement with the reverse driving gear. As disclosed in my said copending application, the rotary members are manually shiftable along the shaft 23 by means of a manually operated shifting fork 28 into selective position for speed increasing or decreasing or reverse shifting positions.

The clutch pedal may be of the usual well known type, fixedly secured to a shaft 30 journalled in the casing 10 (see Figs. 2 and 3), and carrying a lever 31 connected by link 32 to an actuator 33 on a stub shaft 34 mounted in the casing 10. The actuator is preferably in the form of a three armed lever, as shown, having one arm 35 shaped as a cam and engaging roller 36 on arm 37 connected to the clutch release shaft 38, so that the initial depressing movement of the clutch pedal operates to hold the clutch disengaged and prevents the clutch from becoming engaged until the final release of the clutch pedal.

My present invention is an improvement over the construction shown in my prior copending application in the provision of improved means for imparting partial rotation to the rotary ratchet wheels 24, 25 or 27 upon successive depressions of the clutch pedal, and to this end the actuator 33 has a curved arm 40 adapted during the latter portion of the clutch pedal depressing movement to engage a carriage 41 and move it laterally along a guide 42 toward the rear of the transmission casing. The forward end of the carriage may be in the form of a sleeve 43 surrounding the guide 42 and its movement away from the ratchet wheels 24, 25, or 27, is limited by means of a suitable stop 44 fixed on the guide. A coiled spring 45 surrounding the forward circular portion of the guide 42 is positioned between the sleeves 43 of the carriage and a collar 46 on the guide so that movement of the carriage rearwardly by the action of the actuator arm 35 compresses the spring which acts to return the carriage to the normal position upon release of the clutch pedal.

The carriage may be of any form suitable for its purpose, but as here illustrated, comprises a frame having arms 47 extending rearwardly from the sleeve portion 43 on opposite sides of the guide 42 and terminating in a rearward sleeve 48 surrounding the squared end 49 of the guide better to guide and position the carriage in its reciprocative movement. The carriage 41 also may be formed with an intermediate bracket 50 depending from the side arms 47 (see Fig. 4) to provide a support for a plurality of sets of actuating pawls adapted to provide operative connections between the reciprocating carriage 41 and the rotary members 24, 25 or 27. Each set of actuating pawls comprises a pushing pawl 51 pivotally connected as at 52 to the bracket 50 and provided at its free end with a seat portion 53 adapted during rearward travel of the carriage to engage and push the rotary members 24, 25 or 27 through one eighth revolution to effect similar partial rotation of the respective cams and shift the gears from its previous gear drive into neutral position. An oppositely disposed pull pawl 54 pivoted as at 55 to the bracket 50, and provided at its free end with a hooked end 56 is adapted to engage the ratchet wheels 24, 25 or 27 upon return of the slide by the spring 45 and turn them an additional 45 degrees, to effect shifting the transmission gears from neutral position to the next higher or lower speed as the case may be. A spring 57 connecting the opposed pawls of each set serves to hold them in operative position for actuation of the wheels 24, 25 or 27.

The rotary members are alike in constructin and, in the illustrated embodiment of the invention, which contemplates greater revolutions of the cams 17 for shifting from one speed to the next, may be in the form of four-arm ratchet or star wheels having cylindrical heads 58 on the ends of each arm adapted to be engaged by push pawls, and recesses 59 in the webs adjacent the heads 58 and adapted to be engaged by pull pawls.

Thus it will be apparent with the ratchet wheels 24, 25 and 27 in the position shown in Fig. 1 with the wheel 24 in alignment with the pawls 51 and 54 on the left side of the carriage as viewed in Fig. 1, and the pinions 10 and 11 in neutral position, that on rearward movement of the carriage 41, the lower push pawl 51 (see Fig. 3) will engage one of the cylindrical heads 58 of the ratchet wheel 24 and rotate the ratchet wheel and its connected cam 17, forty-five degrees. During this movement the cam rims 20 and 21 are moved from positions $a$ and $a'$ to $b$ and $b'$ (see Fig. 6) without effecting shifting of the pinions 11 and 12 because of the straight sections of the rims 20 and 21 between these points. The carriage 41 is at this time at the ends of its rearward movement, and a semi-cylindrical seat 60 on a rearwardly projecting portion of the bracket 48 (see Fig. 3) engages the adjacent aligned head 58 of the wheel 24 and holds it against accidental shifting until the slide is permitted to move forwardly on release of the clutch pedal. The head 58 in advance of the hooked end of the pull pawl 54 has passed the end of the pawl, which is then positioned, by reason of spring 57, to engage in the seat 59 of the head.

Upon release of the clutch pedal, the spring 45 returns the carriage 41 to its normal position forwardly in the transmission casing 10, causing the pull pawl 54 in engagement with the recess 59 of one of the heads 58 of the wheel 24, to rotate the wheel an additional forty-five degrees, thus rotating the cam 17 and its rims 20 and 21 from $b$ and $b'$ to $c$ and to $c'$ to cause the cam lobe $21^a$ of the rim 21 to shift the yoke 16 and pinion 12 into engagement with the first speed gear (not shown). The next succeeding depression of the clutch pedal, rotates the cam 17 an additional forty-five degrees (from $c$ and $c'$ to $d$ and $d'$) returning the pinions 11 and 12 to the neutral position, and upon release of the clutch pedal, rotates the cam 17 further an eighth revolution ($d$ and $d'$ to $e$ and $e'$) to cause the cam lobe $20^a$ of the rim 20 to shift yoke 15 and pinion 11 into engagement with the second or intermediate speed gear. The next depression of the clutch pedal and consequent eighth revolution of cam 17, (from $e$ and $e'$ to $f$ and $f'$) returns both pinions to neutral position, and release of the clutch pedal permits an additional eighth revolution of the cam 17 (from $f$ and $f'$ to $g$ and $g'$) and causes cam lobe $20^b$ to shift yoke 15 and pinion 11 into engagement with the direct or high speed gear.

Should it be desired to shift the gears successively in descending order, the sleeve 26 may be manually shifted to the left (as viewed in Fig. 1) by means of the shifting fork 28, as in my said copending application, so as to move the ratchet wheel 25 into alignment with the other set of pawls, which are reversely arranged to rotate the wheel 25 and cam 17 in a direction opposite to that just discussed.

Similarly, shifting of the sleeve 26 to the right, as viewed in Fig. 1, brings the reverse gear ratchet wheel 27 into alignment with the first mentioned pawls 51 and 54, causing partial rotation of the wheel 27 and cam 18, to cause shifting of the pinion 12 first to neutral position, and then into engagement with the reverse gear drive.

As above stated, the wheels 24, 25 or 27 are restrained from accidental shifting out of their neutral position by engagement of the seat 60 in the arm 48 with one of the cylindrical heads 58, when the carriage is at the end of its rearward movement. Similarly a seat 62 on the rearward sleeve 48 of the carriage engages an adjacent head 58 of the wheels 24, 25 or 27, (see Figs. 2 and 3) when the carriage is in its forward or normal position, and prevents accidental shifting of the wheels, cams or yokes to move the pinions 11 or 12 out of their selected driving position.

Advantages of my invention reside in the simplicity of construction permitting quick shifting of gears from one speed to the next on a single depression of the clutch pedal. The gears are always neutralized at mid-shift (i. e. when the pedal is completely depressed) which enables the operator to determine with ease and certainty the time for pausing to permit the rotating pinions to lose their inertia before moving them into meshing engagement with the next speed gear.

Furthermore, according to my invention, the work of shifting the gears is effected quickly during final depressing movement of the pedal and during the initial releasing movement thereof, thus avoiding idle movement of the pedal and rendering a greater portion of pedal movement available for its normal function of releasing and re-engaging the clutch.

I claim:

1. In a shiftable change speed gearing including shiftable gears, a clutch therefor, means for shifting said gears successively into engagement with different speed and direction gears, cam means for said shifting means, a foot pedal, and connections associated with said foot pedal for effecting disengagement of said clutch upon initial depression of said pedal and effecting shifting of said gears to neutral position upon final depression of said pedal, means for effecting shifting of said gears to the next progressive speed upon initial release of said pedal and engagement of said clutch upon final release thereof and after engagement of said driving gears has been established, said last named means being operable to shift said gears through successive speeds automatically without manual preselection for forward drive.

2. In a change speed gearing, including shiftable driving pinions, means for selectively shifting said gears into engagement successively with different speed and direction gears, cam means for controlling said gear shifting means, a clutch for said gearing, a control pedal therefor, and connections associated with said pedal for effecting release of the clutch upon initial depression of said pedal, and then effecting movement of said cam to shift said gears to neutral position upon further depressing movement of said pedal, and separate connections associated with said pedal for shifting said gears into driving engagement with selected gears upon release of said pedal, the said first named means being operable to shift said gears through successive speeds automatically without manual preselection for forward drive.

3. In a change speed gearing, including shiftable driving pinions, means for selectively shifting said gears into engagement successively with different speed and direction gears, cam means for controlling said gear shifting means, a clutch for said gearing, a control pedal therefor, and connections associated with said pedal for effecting release of the clutch upon initial depression of said pedal, and then effecting movement of said cam to shift said gears to neutral position upon further depressing movement of said pedal, and separate connections associated with said pedal for shifting said gears into driving engagement with selected gears upon release of said pedal, and while the clutch is held disengaged, the said first named means being operable to shift said gears through successive speeds automatically without manual preselection for forward drive.

4. In a change speed gearing, including shiftable driving pinions, means for selectively shifting said gears into engagement successively with different speed and direction gears, cam means for controlling said gear shifting means, a clutch for said gearing, a control pedal therefor, and connections associated with said pedal for automatically effecting disengagement of the clutch, shifting of the gears to neutral, and then into engagement with the selected gear and engagement of the clutch during a single depression and release of the clutch pedal, the said first named means being operable to shift said gears through successive speeds automatically without manual preselection for forward drive.

5. In a change speed gearing, including shiftable driving pinions, means for selectively shifting said gears into engagement successively with different speed and direction gears, cam means for controlling said gear shifting means, a clutch for said gearing, a control pedal therefor, ratchet wheels connected with said cam members for rotation therewith, and connections associated with said pedal including push and pull pawls for engagement with said ratchet wheels to effect shifting of said gears first into neutral position, and then into engagement with a selected driving gear during a single depression and release of said pedal, said connections acting automatically to disengage said clutch during shifting of said gears.

6. In a change speed gearing, including shiftable driving pinions, means for selectively shifting said gears into engagement successively with different speed and direction gears, cam means for controlling said gear shifting means, a clutch for said gearing, a control pedal therefor, ratchet wheels connected with said cam members for rotation therewith, and connections associated with said pedal including push and pull pawls for engagement with said ratchet wheels to effect successive partial unidirectional rotation of said ratchet wheels and cams for shifting of said gears first into neutral position and then into engagement with a selected driving gear during a single depression and release of said pedal, said connections acting automatically to disengage said clutch during shifting of said gears.

7. In a change speed gearing, including shiftable driving pinions, means for selectively shifting said gears into engagement successively with different speed and direction gears, cam means for controlling said gear shifting means, a clutch for said gearing, a control pedal therefor, ratchet wheels connected with said cam members for rotation therewith, and connections associated with said pedal including oppositely disposed push and pull pawls for engagement with said ratchet wheels to effect successive partial unidirectional rotation of said ratchet wheels and cams for shifting of said gears first into neutral position and then into engagement with a selected driving gear during a single depression and release of said pedal, said connections acting automatically to disengage said clutch during shifting of said gears.

8. In a change speed gearing, including shiftable driving pinions, means for selectively shifting said gears into engagement successively with different speed and direction gears, cam means for controlling said gear shifting means, a clutch for said gearing, a control pedal therefor, and connections associated with said pedal for acting directly to automatically effect disengagement of said clutch and shifting said gears into neutral position, and further means acting automatically to shift said gears into driving engagement with the next successive higher or lower gear during release of the pedal, and prior to engagement of said clutch, the said first named means being operable to shift said gears through successive speeds automatically without manual preselection for forward drive.

9. In a change speed gearing, including shiftable driving pinions, means for selectively shifting said gears into engagement successively with different speed and direction gears, cam means for controlling said gear shifting means, a clutch for said gearing, a control pedal therefor, and connections associated with said pedal for acting directly to automatically effect disengagement of said clutch and shifting said gears into neutral position, and spring means acting automatically to shift said gears into driving engagement with the next successive higher or lower gear during release of the pedal, and prior to re-engagement of said clutch, the said first named means being operable to shift said gears through successive speeds automatically without manual preselection for forward drive.

10. In a change speed gearing, including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, cam members for controlling said shifting means, and means for imparting successive partial movements to said cam members for automatically shifting said gears to neutral and then into engagement with the next higher or lower speed gear.

11. In a change speed gearing, including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, rotatably mounted cam members for controlling said shifting means, a foot pedal, and means controlled by said foot pedal for imparting partial rotation to the cam members to shift said gears into neutral position, during depression of the pedal, and further means independent of the pedal for automatically imparting continued partial rotation of said cam members to shift said gears into engagement with speed gears of the next higher or lower order upon release of the pedal.

12. In a change speed gearing, including shiftable driving pinions, means for selectively shifting said gears into engagement successively with different speed gears in speed increasing or decreasing order, a clutch for said gearing, a control pedal therefor, and means for imparting quarter revolutions to the cam members upon single depression and release of said clutch pedal to effect successively shifting of said gears first into neutral position and then into engagement with the speed gears of the next higher or lower order, the said first named means being operable to shift said gears through successive speeds automatically without manual preselection for forward drive.

13. In a change speed gearing including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, means for controlling said gear shifting means, and means for imparting successive movements to said controlling means, comprising a reciprocable carriage, and means on said carriage adapted for engagement with said controlling means to impart partial movement thereto during opposite reciprocations therefor.

14. In a change speed gearing including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, rotatable means for controlling said gear shifting means, and means for imparting rotation to said control means including a reciprocable carriage and connections associated with said carriage adapted for engagement with said control means to effect automatically unidirectional rotation of said control means during opposite movements of said carriage.

15. In a change speed gearing including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, rotatable means for controlling said gear shifting means, a clutch for said gearing, a control pedal therefor and means for imparting partial rotation of said control means to effect shifting of said pinions for engagement with one gear, through neutral into engagement with the next higher or lower gear during a single depression and release of said pedal, comprising a reciprocating carriage and connections associated with said carriage adapted for engagement with said control means to effect automatically unidirectional partial rotation thereof during opposite movement of said carriage.

16. In a change speed gearing including shiftable driving pinions, means for selectively shifting said pinions into engagement successively with different speed or direction gears, rotatable means for controlling said gear shifting means, a clutch for said gearing, a control pedal therefor and means for imparting partial rotation of said control means to effect shifting of said pinions for engagement with one gear, through neutral into engagement with the next higher or lower gear during a single depression and release of said pedal, comprising a reciprocating carriage, push pawls associated with said carriage and adapted to engage said control means and effect partial rotation of said control means during one movement of said carriage upon depression of said pedal, and pull pawls associated with said carriage adapted to engage control means and effect continued partial unidirectional rotation of said control means during opposite movement of the carriage upon release of said clutch pedal.

17. In a change speed gearing including shiftable driving pinions, means for selectively shifting said pinions into engagement successively with different speed or direction gears, rotatable means for controlling said gear shifting means, a clutch for said gearing, a control pedal therefor and means for imparting partial rotation of said control means to effect shifting of said pinions for engagement with one gear, through neutral into engagement with the next higher or lower gear during a single depression and release of said pedal, comprising a reciprocating carriage, push pawls associated with said carriage and adapted to engage said control means and effect partial rotation of said control means during one movement of said carriage upon depression of said pedal, and pull pawls associated with said carriage adapted to engage said control means and effect continued partial unidirectional rotation of said control means during opposite movement of the carriage upon release of said clutch pedal and spring means adapted to actuate said carriage in its return direction during release of said clutch pedal.

18. In a change speed gearing, including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, a cam member for controlling said shifting means, a ratchet wheel connected with said cam member for rotation therewith, a clutch for said gearing, a control pedal therefor, and connections associated with said clutch pedal for imparting successive partial movements to said ratchet wheel and cam member for automatically shifting said pinions to neutral position, and means controlled upon the release of said clutch control pedal for shifting said pinions into engagement with next higher or lower speed gear.

19. In a change speed gearing, including shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, a cam member for controlling said shifting means, a ratchet wheel connected with said cam member for rotation therewith, a clutch for said gearing, a control pedal therefor, and connections associated with said clutch pedal and operative during movement in one direction thereof for effecting partial rotation of said ratchet wheel and cam member to automatically shift said pinion to neutral position, and operative during opposite movement of said pedal for automatically shifting said pinions into engagement with the next higher or lower speed gear.

20. In a change speed gearing having shiftable driving pinions, means for manually pre-selecting the order and direction of gear shifting, means for successively shifting said pinions into engagement with successive driving gears automatically through cycles to and from neutral position either pre-selected speed increasing or speed decreasing order for forward drive or for reverse drive, means for controlling said gear shifting means, operating means therefor including a reciprocable carriage, a clutch for said gearing, a control pedal therefor, an actuating lever having operative connection with said clutch pedal, and adapted upon depression of said clutch pedal to engage and actuate said carriage in one direction, and means for effecting shifting of said pinions into engagement with the next higher or lower speed gear during movement of the carriage in the opposite direction on release of the clutch pedal.

In testimony whereof, I have signed my name to this specification.

DONALD C. DOBBINS.